(12) United States Patent
Thompson et al.

(10) Patent No.: US 11,468,707 B2
(45) Date of Patent: Oct. 11, 2022

(54) AUTOMATIC IMAGE CLASSIFICATION IN ELECTRONIC COMMUNICATIONS

(71) Applicant: Microsoft Technology Licensing, LLC, Redmond, WA (US)

(72) Inventors: Kathleen Rae Thompson, Redmond, WA (US); Hayley Steplyk, Seattle, WA (US); Joseph Patrick Masterson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 703 days.

(21) Appl. No.: 15/887,869

(22) Filed: Feb. 2, 2018

(65) Prior Publication Data

US 2019/0244012 A1 Aug. 8, 2019

(51) Int. Cl.
| | |
|---|---|
| *G06V 40/16* | (2022.01) |
| *G06Q 10/10* | (2012.01) |
| *G06F 16/583* | (2019.01) |
| *G06F 16/51* | (2019.01) |
| *H04L 51/08* | (2022.01) |

(52) U.S. Cl.
CPC ............ *G06V 40/172* (2022.01); *G06F 16/51* (2019.01); *G06F 16/5838* (2019.01); *G06Q 10/107* (2013.01); *G06V 40/171* (2022.01); *H04L 51/08* (2013.01)

(58) Field of Classification Search
CPC ............ G06K 9/00288; G06K 9/00281; G06F 16/5838; G06F 16/51; H04L 51/08
See application file for complete search history.

(56) References Cited

U.S. PATENT DOCUMENTS

| | | | |
|---|---|---|---|
| 7,945,653 B2 | 5/2011 | Zuckerberg et al. | |
| 8,589,433 B2 | 11/2013 | Gawor et al. | |
| 8,810,684 B2 | 8/2014 | Chang | |
| 9,392,078 B2 * | 7/2016 | Seliger | G06F 9/45558 |
| 9,754,188 B2 | 9/2017 | Mei et al. | |

(Continued)

FOREIGN PATENT DOCUMENTS

| | | | | |
|---|---|---|---|---|
| EP | 2557524 A1 | | 2/2013 | |
| KR | 2012-0040483 | * | 4/2012 | ........... G06F 11/1448 |

OTHER PUBLICATIONS

"International Search Report And Written Opinion Issued In PCT Application No. PCT/US19/013885", dated Apr. 3, 2019, 12 Pages.

(Continued)

*Primary Examiner* — Amara Abdi

(57) ABSTRACT

Techniques of automatic image classification and modification in computing systems are disclosed herein. In one embodiment, a method includes scanning an inbox on email servers for emails containing image files. Upon detecting that an email in the inbox contains an image file, the method includes retrieving an identification photo of a user from a data store. The method also includes determining, via facial recognition, whether the image file in the email contains at least a partial image of the user based on the retrieved identification photo. In response to determining that the image file in the email contains at least a partial image of the user, a metadata value is inserted into the image file indicating that the image file contains at least a partial image of the user before the image file is stored in the inbox on the one or more email servers.

20 Claims, 8 Drawing Sheets

(56) References Cited

U.S. PATENT DOCUMENTS

| | | | |
|---|---|---|---|
| 2006/0031309 A1* | 2/2006 | Luoffo | G06Q 10/107 709/206 |
| 2006/0044635 A1* | 3/2006 | Suzuki | G06F 16/58 358/448 |
| 2009/0077182 A1* | 3/2009 | Banjara | H04L 51/234 709/206 |
| 2009/0144378 A1* | 6/2009 | Cassanova | H04L 51/224 709/206 |
| 2011/0044512 A1 | 2/2011 | Bambha et al. | |
| 2011/0153341 A1* | 6/2011 | Diaz-Cortes | G16H 30/20 345/1.3 |
| 2015/0189118 A1* | 7/2015 | Ogata | H04N 13/178 348/231.3 |
| 2017/0083517 A1* | 3/2017 | Mitkar | G06F 16/51 |
| 2018/0006983 A1* | 1/2018 | Steplyk | H04L 51/42 |

OTHER PUBLICATIONS

"Automatically tagging and categorizing incoming email", Retreived From <<https://web.archive.org/web/20150802224337/https:/www.techhit.com/SimplyTag/help/automatically-tagging-incoming-email.html>>, Aug. 2, 2015, 1 Page.

"Facebook's New Facial Recognition Photo Tagging: How to Use (Or Not Use)", Retreived From <<https://vtldesign.com/digital-marketing/social-media/nh-facebook-marketing/how-to-disable-facebook-facial-recognition-photo-tagging-nhmarketing/>>, Retrieved on: Dec. 12, 2017, 10 Pages.

"Flight by Canto—Organize", Retreived From <<https://www.canto.com/flight/features/organize/>>, Retrieved on: Dec. 12, 2017, 6 Pages.

"Office Action Issued in European Patent Application No. 19704113.0", dated Nov. 11, 2021, 6 Pages.

\* cited by examiner

AUTOMATIC IMAGE CLASSIFICATION IN ELECTRONIC COMMUNICATIONS

BACKGROUND

Electronic Mail ("email" or "e-mail") is a technique of exchanging messages between users using computers, smart phones, or other suitable types of electronic devices. Email exchanges operate across computer networks such as the Internet or an intranet. Today's email systems are typically based on a store-and-forward model utilizing email servers to accept, forward, and store email messages. Users or their computers can connect to email servers or webmail interfaces via a computer network to send or receive email messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An email message typically includes a message header, a message body, and optionally one or more attachments appended to the email message. A message header can include structured data fields individually containing source/destination (e.g., "To:" or "From") and/or other suitable information describing the email message. A message body can contain data, such as in plain text or Hypertext Markup Language text, representing information conveyed in the email message. Attachments can include Microsoft Word® documents, images, videos, or other suitable types of files. According to the store-and-forward model, when an email message is received at an email server of a recipient, a copy of the message body and the one or more optional attachments are stored on the email server in, for example, an inbox of the recipient. The email server can also forward a copy of the email message to the recipient upon detecting that the recipient is connected via a computer network.

One drawback of the foregoing store-and-forward model is a lack of content classification of any attachments stored in the recipient's inbox on the email server. The lack of content classification can render accessing attached image files (or other types of files) in the user's inbox rather difficult and inefficient. For instance, typical search functions in email clients or web applications only provide functionalities for searching message bodies, sender/recipient names, etc., but not content in the attached files. Thus, a recipient typically needs to browse through email messages in the recipient's inbox one by one in order to locate image files containing images of particular people, places, themes, etc. As such, searching for particular image files received as attachments can be cumbersome to negatively impact user experience.

Several embodiments of the disclosed technology can improve user access to image or other types of files included as email attachments by automatically classifying such files. In certain embodiments, an email server can execute suitable instructions to provide an image classifier configured to automatically classify or "tag" content in image files. In one implementation, the image classifier can include a scanner configured to detect any image files in email attachments continuously, periodically, upon reception, or in other suitable manners. Upon detecting one or more image files (referred to as "unclassified image files"), a retriever of the image classifier can retrieve one or more images with known or previous classified content (referred to as "known image files") from a global contact list or other suitable sources.

A comparator of the image classifier can then compare the unclassified image files and the known image files to identify content (e.g., images of users, scenery, etc.) included in the unclassified image files. In one embodiment, the known image files can include identification photos of users in a corporation, social network, or other suitable types of organization. For example, a known image file can include an identification photo of user named "Jon Snow" in a company. In other embodiments, the known image files can also include photos previously classified or "tagged" by individual users as containing images of certain users or content items such as trees, buildings, mountains, etc.

The comparator can then identify one or more content items in the unclassified image files based on the identified content items in the known image files. In certain embodiments, the comparator can be configured to extract landmarks or features from an identification photo of a user's face. The comparator can then determine whether the unclassified image files contain at least a partial image of the user based on the extracted landmarks or features. In other embodiments, the comparator can also apply three-dimensional recognition, skin texture analysis, or other suitable facial recognition techniques to identify the user and one or more additional users in the unclassified image files.

Once the comparator indicates that a user is identified in the unclassified image file, a modifier of the image classifier can insert or modify metadata or other suitable description data of the unclassified image file to indicate that the unclassified image file contains an image of the identified user. For example, the modifier can insert a text value in a metadata field indicating that an image of "Jon Snow" is contained in the unclassified image file and mark the unclassified image file as now classified or "known." The modifier can then allow the unclassified image file be stored in the inbox of the recipient along with the inserted or modified value in the metadata field. In other examples, the modifier can also update an image search index on the email server. The image search index can contain entries individually identifying images corresponding to users, scenery, or other suitable content items.

The foregoing automatic classification can improve searching efficiency for locating desired image files included in attachments of email messages. For example, in certain embodiments, the email server can also provide a facility (e.g., a search field) that allows a user to enter a search term, e.g., "Jon Snow." In response to receiving a search command, the email server can look up the image search index, scan the user's inbox for any images having a metadata field containing "Jon Snow," or otherwise locate image files in which "Jon Snow" is tagged. Subsequently, the email server can display all image files in the user's inbox that are identified as containing an image of "Jon Snow," as a list of files, thumbnails, a thumbnail gallery, or other suitable format. As such, the user can have ready access to all image files contained in any of the user's emails as attachments or inline images without manually browsing through all the email messages one by one.

DETAILED DESCRIPTION

Figure 1:
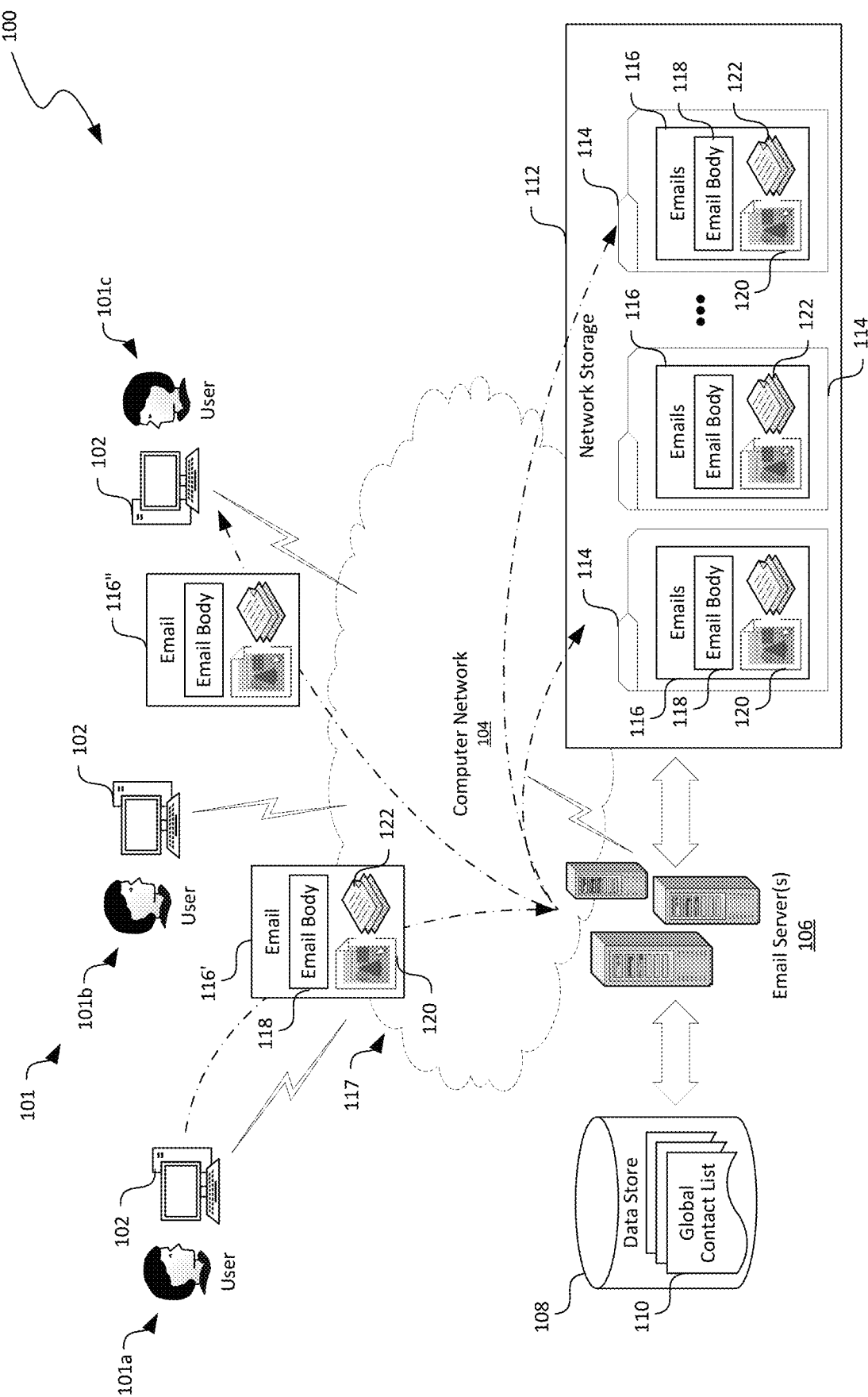
FIG. 1 is a schematic diagram illustrating a computing system implementing automatic image classification in accordance with embodiments of the disclosed technology.

Certain embodiments of systems, devices, components, modules, routines, data structures, and processes for automatic image classification in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "email server" generally refers to computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. As used herein, an "inbox" is a file folder configured to contain data representing incoming emails for a user. The email server can also maintain and/or access one or more outboxes configured to contain outgoing emails and/or other suitable mailboxes.

Also used herein, an "attachment" or "email attachment" generally refers to a file appended to an email. An attachment can be any suitable types of files. For example, an attachment can be an image file, a video file, a document file, etc. An "image file" as used herein generally refers to a digital file configured to organize and store digital images. Image files can be composed of digital data in one of these formats that can be rasterized for use on a computer display or printer. An image file format may store data in uncompressed, compressed, vector, or other suitable formats. Once rasterized, an image file becomes a grid of pixels, each of which has a number of bits to designate a color equal to a color depth. Example image file formats include Joint Photographic Experts Group, Exchangeable image file format, Tagged Image File Format, Graphics Interchange Format, bitmap file format, and Portable Network Graphics. In addition, the term "content" of an image or other suitable types of file generally refers to subject matter contained in a file. Content in a file can include one or more content items. For example, an image file can include various content items such as an image of persons, scenes, objects, or other suitable graphical components. In another example, a document file (e.g., a Word® document) can include various content items such as titles, subtitles, etc.

As used herein, the term "facial recognition" generally refers to identifying or verifying a person from a digital image or a video frame from a video source, for example, by comparing selected facial features from the digital image and facial data in a database. Example facial recognition techniques can identify facial features by extracting landmarks, or features, from the image of the person's face. For instance, a relative position, size, and/or shape of the eyes, nose, cheekbones, and jaw may be used as landmarks or features. These landmarks or features can then be used to search for other images with matching landmarks or features. Other example facial recognition techniques can also utilize three-dimensional facial recognition, skin texture analysis, or other suitable techniques.

Email servers following the store-and-forward model for handling emails typically lack an ability to classify attachments of emails based on content. The lack of classification can render accessing attached image files rather difficult and inefficient. For instance, typical search functions only provide functionalities for searching message bodies, sender/recipient names, etc. in emails, but not content in any attached files. Thus, a user typically needs to browse through email messages in the user's inbox one by one in order to locate image files containing images of particular people, places, themes, etc. As such, searching for particular image files received as attachments can be cumbersome and inefficient.

Several embodiments of the disclosed technology can improve user access to image or other types of files included as attachments to emails by automatically classifying such attached files. In certain embodiments, an email server can be configured to detect attached image files, retrieve known images of users, and identify people, scenery, objects, or other suitable types of content included in the attached image files. The email server can then update one or more metadata fields of the image files to indicate the detected content items. As such, a user can quickly and efficiently locate desired image files by searching the metadata values. Thus, manual browsing of emails one by one to locate the desired image files may be avoided, as described in more detail below with reference to FIGS. 1-6.

FIG. 1 is a schematic diagram illustrating a computing system 100 implementing automatic image classification in accordance with embodiments of the disclosed technology. As shown in FIG. 1, the computing system 100 can include a computer network 104 interconnecting client devices 102 and one or more email servers 106 (referred to as "email server 106" here in for simplicity). The email server 106 is also interconnected with a network storage 112 containing one or more inboxes 114 and a data store 108 containing a global contact list 110. The computer network can include an intranet, a wide area network, the Internet, or other suitable types of network. Even though particular components of the computing system 100 are shown in FIG. 1, in other embodiments, the computing system 100 can also include additional and/or different components or arrangements. For example, in certain embodiments, the computing system 100 can also include additional network storage devices, additional hosts, and/or other suitable components (not shown). In other embodiments, the network storage 112 and/or the data store 108 may be integrated into the email server 106.

The client devices 102 can each include a computing device that facilitates corresponding users 101 to access computing services provided by the email server 106 via the computer network 104. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the computing system 100 can facilitate any suitable number of users 101 to access suitable types of computing services provided by the email server 106.

The email server 106 can be configured to facilitate email reception, storage, forwarding, and other related functionalities. For example, as shown in FIG. 1, the first user 101a can utilize the client device 102 to generate and transmit an email 116' to the email server 106. The email 116' is destined to the third user 101c and can include an email header (not shown), an email body 118, and one or more attachments 117. In the illustrated example, the attachments 117 include an image file 120 and a document 122. In other examples, the attachments 117 can include one or more video files, executable files, or other suitable types of files.

Upon receiving the email 116' from the first user 101a, the email server 106 can store a copy of the email 116' in inboxes 114 on the network storage 112 that correspond to the first user 101a and the third user 101c. In particular, the email server 106 can store both the email header, the email body 118, and the attached image file 120 and document 122 in the respective inboxes 114. Subsequently, the email server 106 can forward another copy of the email 116" to the client device 102 of the third user 101c. Even though the email server 106 is described above as being configured to facilitate storing and forwarding emails 116 for both the first and third users 101a and 101c, in other embodiments, additional email servers (not shown) may be utilized to separately facilitate similar functionalities for the first and third users 101a and 101c.

The email server 106 can also include an image classifier 130 (shown in FIGS. 2A-2C) that is configured to automatically classify attached image files 120 in the emails 116. As such, the users 101 can have ready access to classified image files 120 without manually browsing through the emails 116 in respective inboxes 114. In certain implementations, the image classifier 130 can be configured to perform such automatic classification based on previously classified image files 120 in the inboxes 114. In other embodiments, the image classifier 130 can be configured to perform such automatic classification based on identification photos of the users 101 in the global contact list 110 stored in the data store 108.

As used herein, a "global contact list" generally refers to data that represent an address book that contains users of a company, school, social network, or other suitable types of organization. This address book can be accessed over the computer network 104 using Lightweight Directory Access Protocol ("LDAP"), vCard Extensions to WebDAV ("CardDAV"), or another suitable protocol. Example components of the global contact list 110 can include electronic and/or physical addresses, organizational position, telephone numbers, profile or identification photos, and/or other suitable information. The global contact list 110 can be managed by an administrator (not shown) or at least partially managed by the individual users 101.

As described in more detail below with reference to FIGS. 2A-2C, the email server 106 can compare content items in the attached image files 120 with those in the profile or identification photos of the users 101 to automatically indicate or "tag" images of the users 101 in the attached image files 120. Though various embodiments of the disclosed technology are described below as being directed to identifying images of users 101, embodiments of the disclosed technology can also be applied to identify images of scenery (e.g., ocean, mountain, desert, etc.), objects (e.g., cars, boats, bicycles, etc.), animals (e.g., dogs, cats, birds, etc.), and/or other suitable types of images.

Figure 2A:
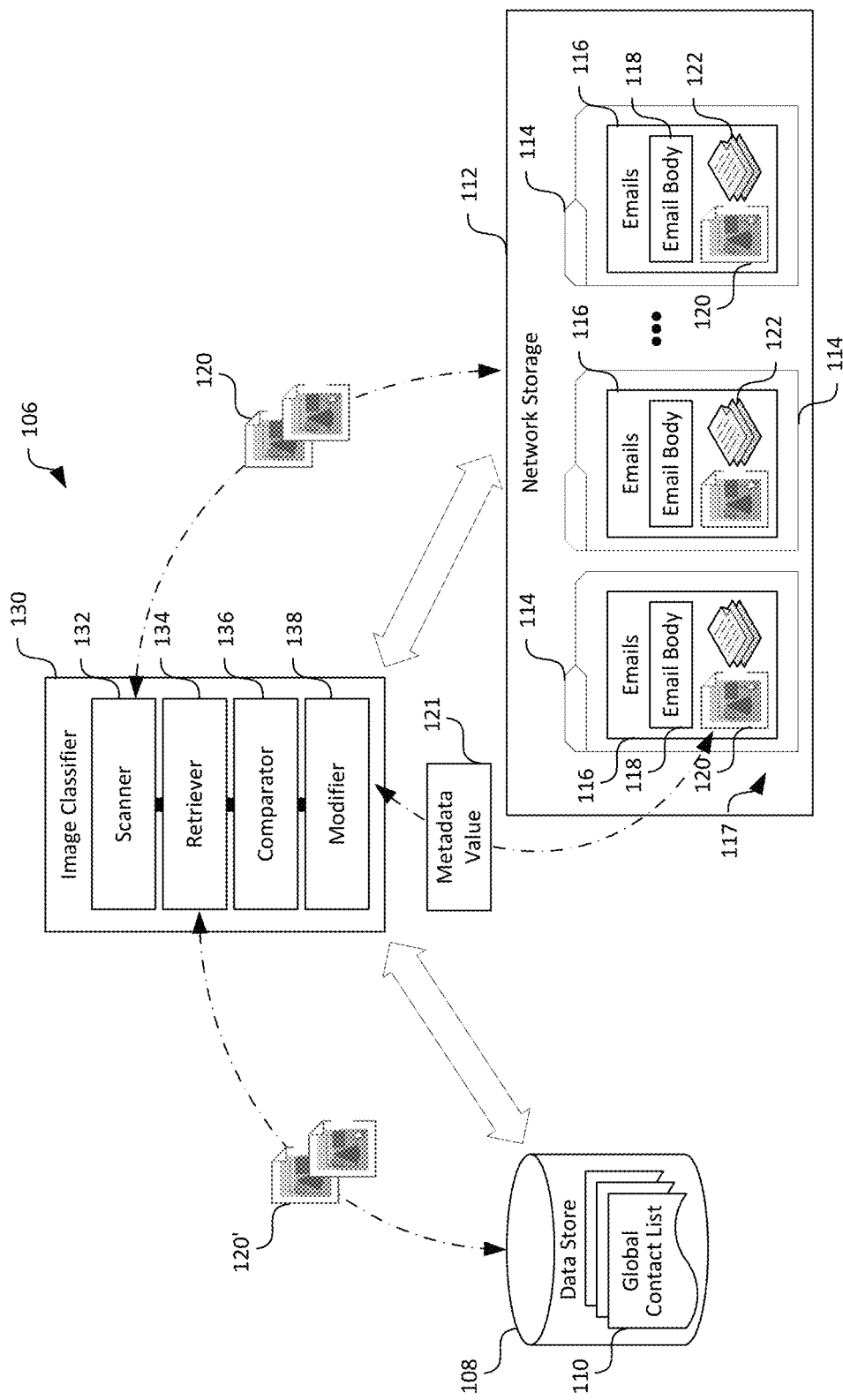
FIGS. 2A-2C are schematic diagrams illustrating certain hardware/software components of the computing system of FIG. 1 during various stages of automatic image classification in accordance with embodiments of the disclosed technology.
Figure 2B:
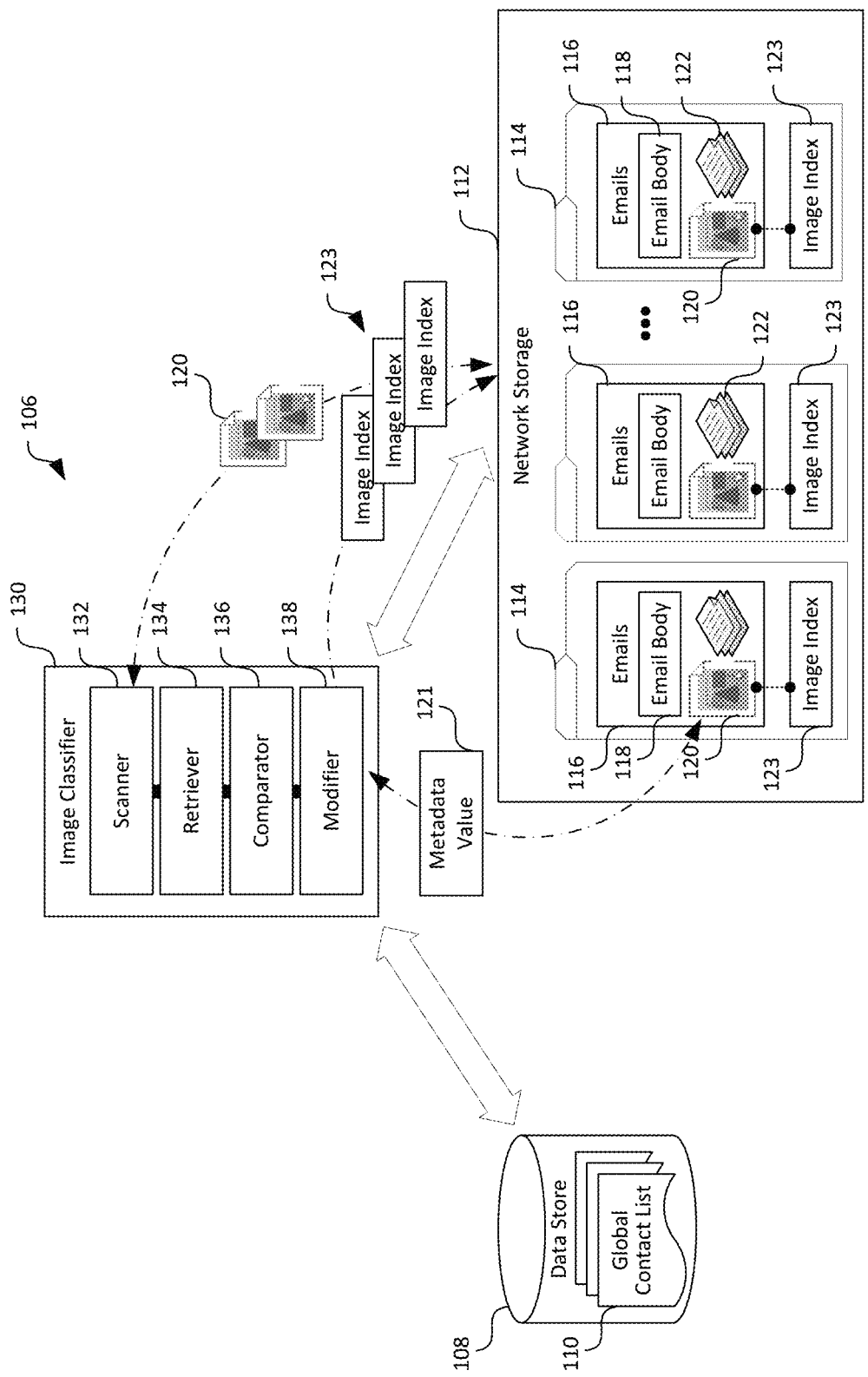
Figure 2C:
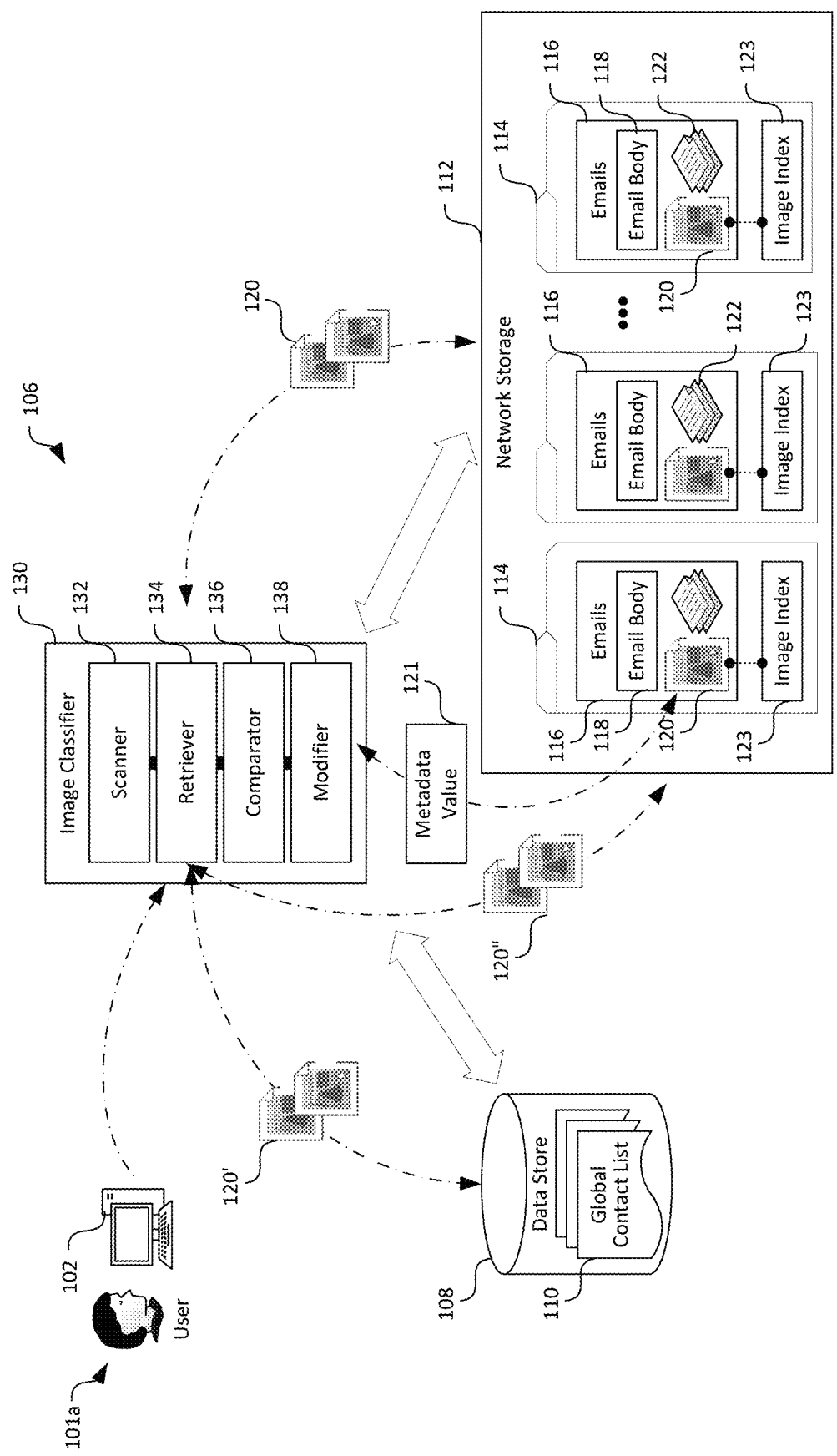

FIGS. 2A-2B is a schematic diagram illustrating certain hardware/software components of the computing system 100 during various stages of automatic image classification in accordance with embodiments of the disclosed technology. In FIGS. 2A-2C, only certain components of the computing system 100 of FIG. 1 are shown for clarity. In FIG. 2A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the image classifier 130 can include a scanner 132, a retriever 134, a comparator 136, and a modifier 138 operatively coupled to one another. Even though the foregoing components are shown as integral to the image classifier 130, in other embodiments, one or more of these components may be hosted or otherwise made available by computing devices external to the email server 106. For example, the comparator 136 may be hosted on a separate server (not shown) and can communicate with the other components via Application Programming Interface (API) or other suitable data interfaces.

The scanner 132 can be configured to scan an inbox 114 on the network storage 112 for emails 116 containing one or more image files 120. In certain embodiments, the scanner 132 can be configured to sequentially scan individual emails 116 in the inbox 114 and identify the attachments 117. Upon identifying the attachments 117, the scanner 132 can then determine whether the attached files are image files 120 based on one or more of a file extension, a file format, metadata included with the file, or other suitable information. Upon detecting an image file 120 included as an attachment 117 in an email 116, the scanner 132 can indicate to the retriever 134 that an image file 120 is waiting for classification. In certain embodiments, the scanner 132 can scan the inboxes 114 on the network storage 112 periodically (e.g., once every day). In other embodiments, the scanner 132 can scan the individual emails 116 upon receiving and storing a copy of the emails 116 in the individual inboxes 114, or in other suitable manners.

Upon receiving the indication from the scanner 132, the retriever 134 can be configured to retrieve profile or identification photos 120' of one or more persons, such as the users 101 (FIG. 1) and associated identification information such as names/aliases, addresses, or other suitable data. In certain embodiments, the profile or identification photo 120' can include an image of at least a face of a person (e.g., "Jon Snow"). In other embodiments, the profile or identification photo 120' can include other suitable images of the person. The retriever 134 can then forward the retrieved data to the comparator 136 for further processing.

The comparator 136 can be configured to determine, via facial recognition, whether the image file 120 in the email 116 contains at least a partial image of the person based on the retrieved profile or identification photo 120' of the person. For example, in one embodiment, the comparator 136 can be configured to extract one or more landmarks or features from the retrieved profile or identification photo 120 of the person's face. Example landmarks or features can include a relative position, size, and/or shape of the eyes, nose, cheekbones, and jaw. The comparator 136 can then determine whether the extracted one or more landmarks are also present in the image file 120.

In response to determining that the image file 120 in the email 116 contains at least a partial image of the person, the comparator 136 can be configured to indicate to that modifier 138 that an image of the person is detected in the image file 120. In response, in one implementation, the modifier 138 can be configured to automatically insert a metadata value 121 into the image file 120 indicating that the image file 120 contains at least a partial image of the person and store the image file 120 along with the inserted metadata value 121 in the inbox 114 on the network storage 112. In another implementation, the modifier 138 can generate and provide a notification (e.g., via another email 116) to the user 101 corresponding to the inbox 114 and request the user 101 to confirm that the image file 120 indeed contains the identified image of the person. Upon confirmation from the user 101, the modifier 138 can insert or modify the metadata value 121. In some embodiments, a copy of the email 116 with the image file 120 having the inserted metadata value 121 can also be transmitted to the client device 102 (FIG. 1) for the user 101 in addition to storing the image file 120 along with the inserted metadata value 121 in the inbox 114.

In other embodiments, as shown in FIG. 2B, the modifier 138 can also be configured to modify or update an image index 123 to indicate that the stored image file 120 contains at least a partial image of the person. As shown in FIG. 2B, each inbox 114 is shown to contain a separate image index 123. In other embodiments, the image index 123 can also be aggregated for a group of users 101. The image index 123 can be configured to facilitate searching of image files 120 in the individual inboxes 114, as described in more detail below with reference to FIGS. 3A and 3B.

Even though the operations of the image classifier 130 are described above as being based on profile or identification photos 120' of a person retrieved from the global contact list 110, in other embodiments, the automatic classification can also be based on previously classified or "tagged" image files 120. For example, as shown in FIG. 2C, the user 101 can identify or "tag" the image files 120 in a corresponding inbox 114 as containing images of particular persons. The user 101 can indicate to, for instance, the modifier 138 that a particular image file 120 contains an image of another user 101. In response, the modifier 138 can insert additional metadata values 121 into the image file 120, as described above with reference to FIG. 2B.

Subsequently, during automatic classification, the retriever 134 can be configured to retrieve the profile or identification photos 120' from the global contact list 110 and any previously classified or tagged image files 120" by the user 101. The comparator 136 can then utilize both the retrieved profile or identification photos 120' and the previously classified image files 120" for determining, via facial recognition, whether a new or unclassified image file 120 in the email 116 contains at least a partial image of the user 101.

Figure 3A:
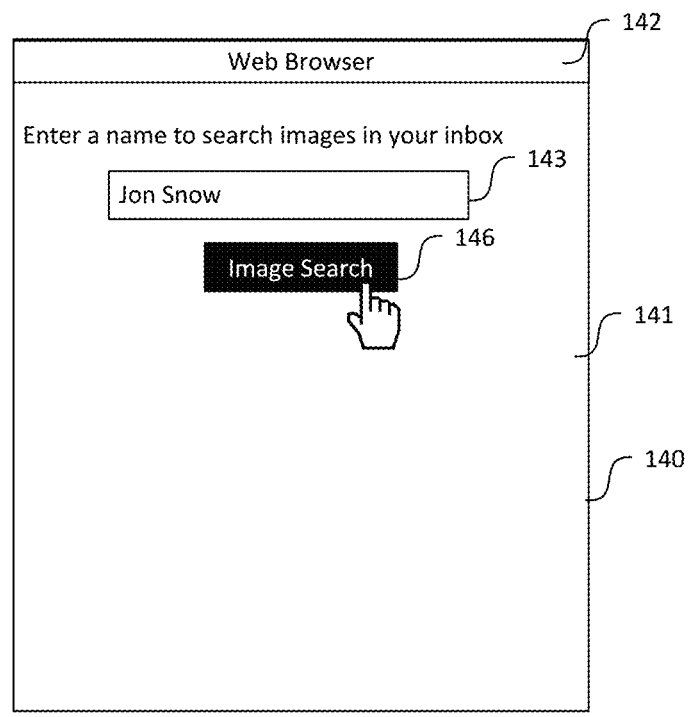
FIGS. 3A and 3B are schematic diagrams illustrating an example user interface configured to facilitate image searching based on automatic classification of images in accordance with embodiments of the disclosed technology.
Figure 3B:
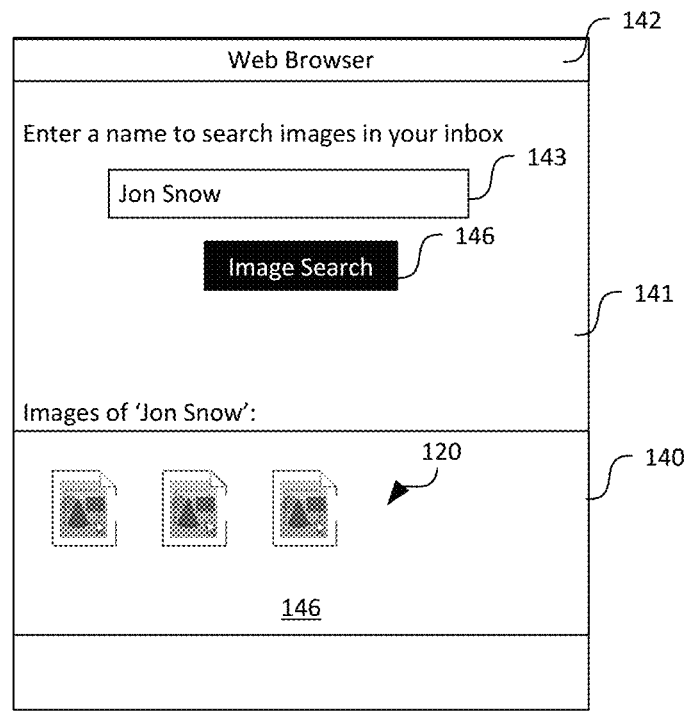

FIGS. 3A and 3B are schematic diagrams illustrating an example user interface 140 configured to facilitate image searching based on automatic classification of images in accordance with embodiments of the disclosed technology. As shown in FIG. 3A, the user interface 140 can include a web page 141 opened in a web browser 142. In the illustrated example, the web page 141 can include an input field 143 configured to receive a search query, for example, "Jon Snow." The web page 141 can also include an actuation element 146, such as the button labeled "Image Search." Upon receiving a user input to the actuation element 146, the user interface 140 can be updated to provide a gallery 146 that contains all image files 120 identified as individually containing at least a partial image of a user named "Jon Snow."

Several embodiments of the disclosed technology can facilitate efficient image searching as described above with reference to FIGS. 3A and 3B. For example, upon receiving the user input on the actuation element 146, a search engine (not shown) can identify the image files 120 individually containing at least a partial image of a user named "Jon Snow" by inspecting the metadata values 121 of the individual image files 120. In another example, the search engine can also identify the image files 120 by looking up the image index 123 based on the received search query. As such, a user searching for image files 120 with particular content items such as a person does not need to browse through all the emails 116 in a corresponding inbox 114. Thus, user experience of the email service provided by the email server 106 may be improved.

Even though the disclosed technology is described above in the context of identifying content in image files, in other embodiments, the disclosed technology can also be used to automatically classify other suitable types of files attached to emails 116. For instance, document files may be classified based on one or more of titles, subtitles, keywords, or other suitable criteria. In one example, document files attached to emails 116 can be scanned for keywords (e.g., "Jon Snow") and indexed based on such keywords. Subsequently, the indexed keywords may be used to facilitate efficient searching of document files containing such keywords.

Figure 4A:
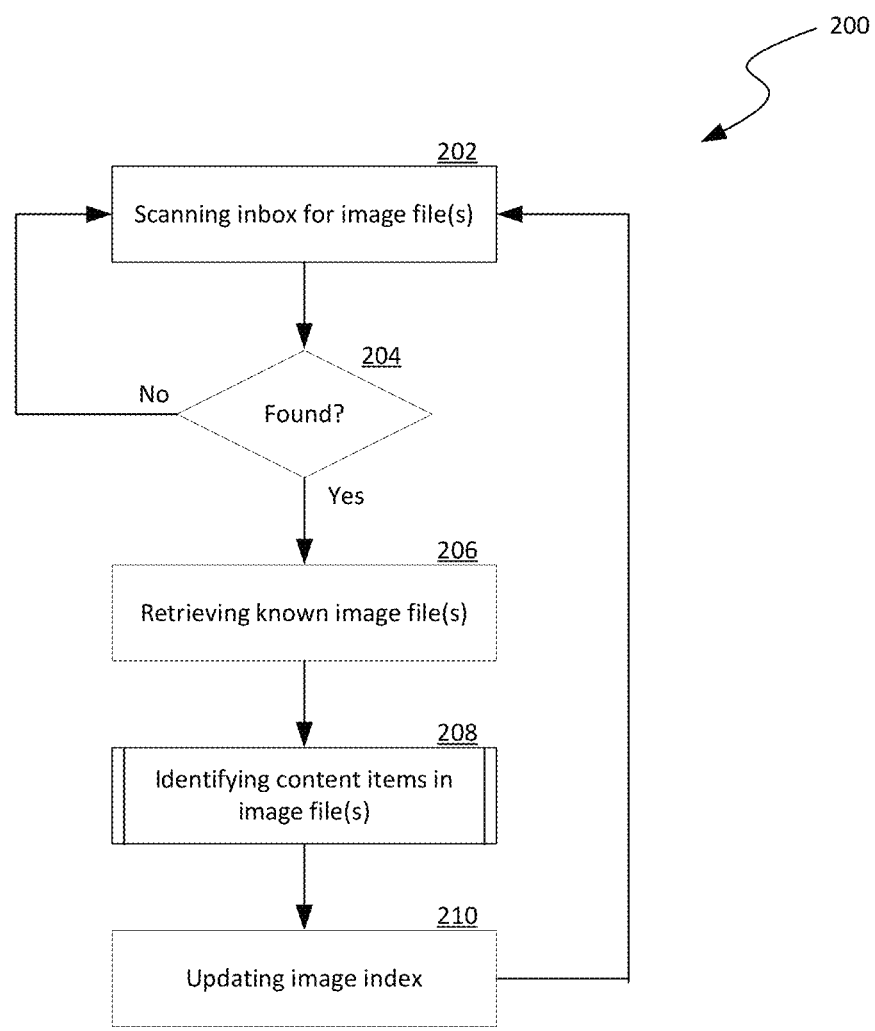
FIGS. 4A and 4B are flowcharts illustrating a process of automatic image classification in accordance with embodiments of the disclosed technology.
Figure 4B:
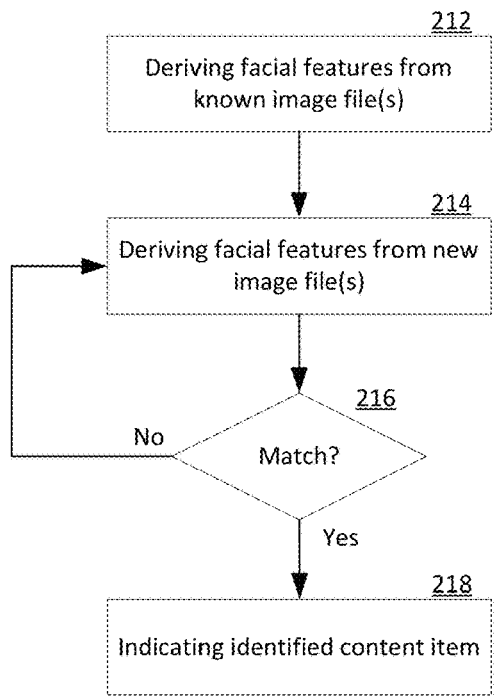

FIGS. 4A and 4B are flowcharts illustrating a process 200 of automatic image classification in accordance with embodiments of the disclosed technology. Even though embodiments of the process 200 are described below with reference to the computing system 100 of FIGS. 1-2C, in other embodiments, the process 200 may be implemented in other computing systems with different components and/or arrangements.

As shown in FIG. 4A, the process 200 can include scanning emails in an inbox for image files at stage 202. In certain embodiments, the emails in the inbox can be examined one by one to determine i) whether an email includes an attachment or inline file; and ii) upon detecting that an attachment or inline file, determine whether the attached or inline file is an image files. Techniques for performing such determinations are described above with reference to FIG. 2A.

The process 200 can then include a decision stage 204 to determine whether an image file is found. In response to determining that an image file is not found, the process 200 reverts to scanning additional emails in the inbox at stage 202. In response to determining that an image file is found, the process 200 proceeds to retrieving known image files at stage 206. In certain embodiments, the known image files can include profile or identification photos contained in a global contact list or other suitable directory data. In other embodiments, the known image files can also include image files that a user of the inbox has previously classified or tagged as containing an image of a person, scenery, objection, or other suitable types.

The process 200 can then include identifying content items in the image files at stage 208. In certain embodiments, the content items, such as an image of a person, can be identified by applying facial recognition based on the known image files. Example facial recognition operations are described below with reference to FIG. 4B. In other embodiments, the content items, such as keywords, can be identified by, for instance, word searching, phrase comparison, or other suitable techniques.

The process 200 can further include updating an image index at stage 210. The image index can include entries individually containing content information corresponding to each of the image files. For example, the image index can include an array containing value pairs each having a person's name (e.g., "Jon Snow") and a corresponding image file (e.g., "image001.jpeg"). The image index can then be used for searching for image files containing an image of the person based on each of the entries in the image index.

FIG. 4B illustrate example operations for performing facial recognition of persons in an image file. As shown in FIG. 4B, the operations can include deriving facial features from known image files, such as profile or identification photos at stage 212. The operations can then include deriving facial features from new image files at stage 214. In response to determining that the derived facial features from the known image files do not match those in the new image files, the operations can revert to deriving facial features of additional images in the new image files at stage 214. Otherwise, the operations can include indicating that a person (or other suitable image types) is identified in the new image files.

Figure 5:
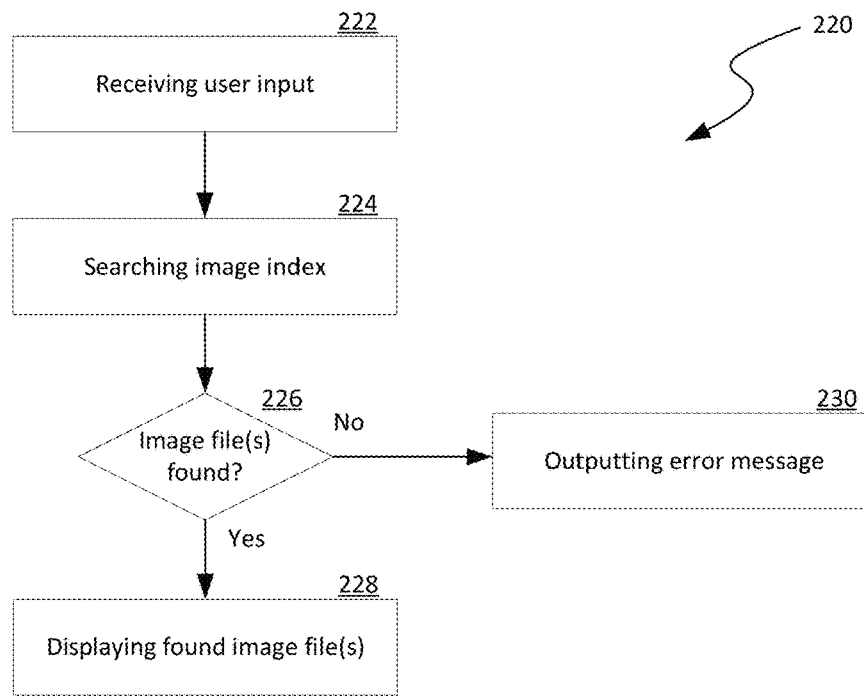
FIG. 5 is flowchart illustrating a process of searching for images based on automatic image classification in accordance with embodiments of the disclosed technology.

FIG. 5 is flowchart illustrating a process 220 of searching for images based on automatic image classification in accordance with embodiments of the disclosed technology. As shown in FIG. 5, the process 220 can include receiving a user input at stage 222 and searching an image index based on the received user input at stage 224. The process 220 can then include a decision stage 226 to determine whether at least one image files that the received user input is found. In response to determining that no image files have been found during the search, the process 220 can include outputting an error message indicating that no image files matching the received user input have been found at stage 230. In response to determining that one or more image files have been found during the search, the process 220 can include outputting or displaying the image files matching the received user input at stage 228. In one embodiment, the image files can be displayed in an image gallery. In other embodiments, the image files can be displayed as thumbnails, a list of file names, or in other suitable manners.

Figure 6:
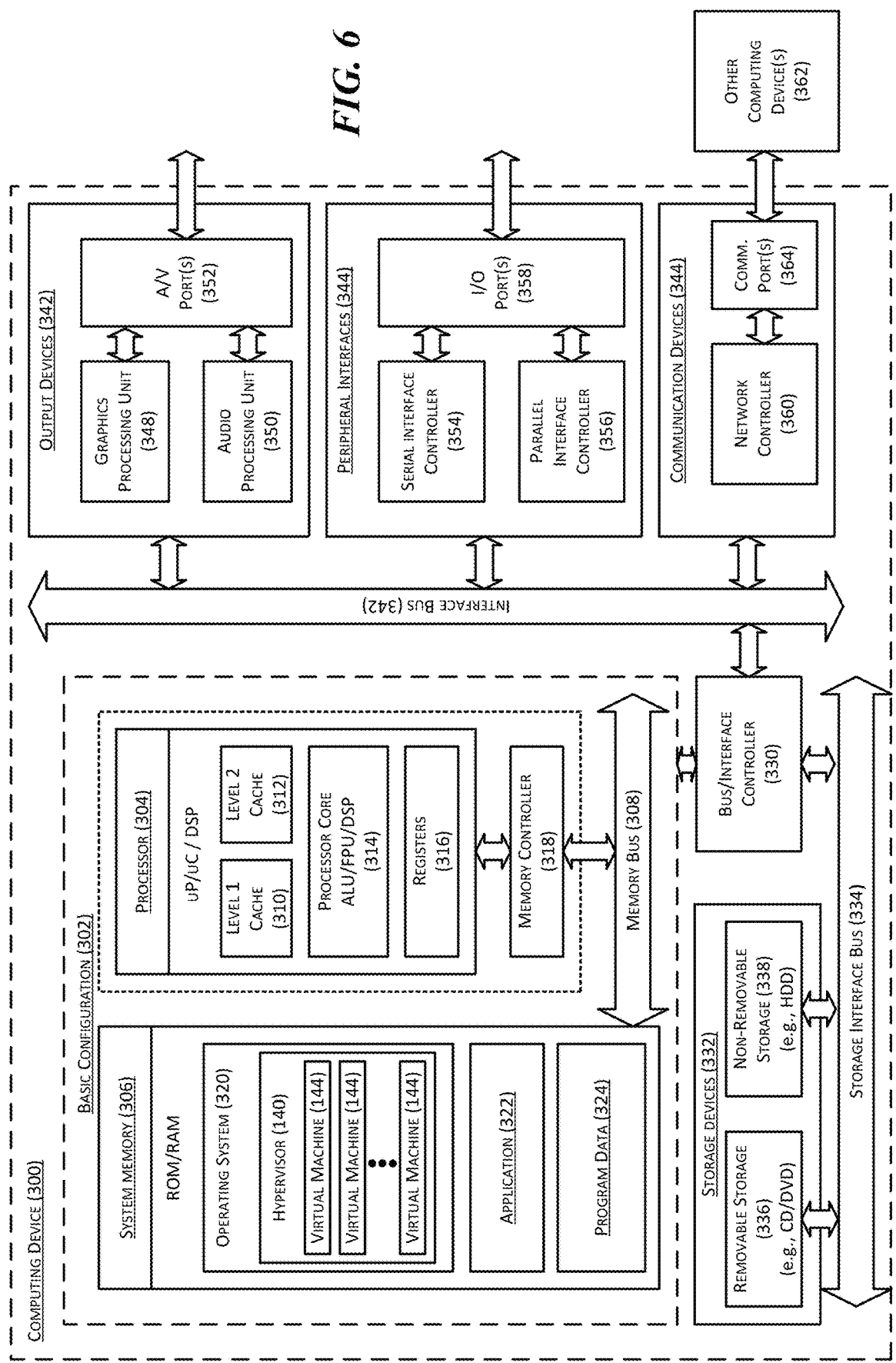
FIG. 6 is a computing device suitable for certain components of the distributed computing system in FIG. 1.

FIG. 6 is a computing device 300 suitable for certain components of the distributed computing system 100 in FIG. 1. For example, the computing device 300 can be suitable for the email server 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for automatic image classification in a computing system having one or more email servers interconnected to client devices by a computer network, the method comprising:
   scanning an inbox on the one or more email servers for emails containing one or more image files; and
   upon detecting that an email in the inbox contains an image file,
   retrieving, via the computer network, an identification photo of a user from a data store containing entries of user identifications and corresponding identification photos;
   determining, via facial recognition, whether the image file in the email contains at least a partial image of the user based on the retrieved identification photo of the user; and
   in response to determining that the image file in the email contains at least a partial image of the user, inserting a metadata value into the image file indicating that the image file contains at least a partial image of the user and storing the image file along with the inserted metadata value in the inbox on the one or more email servers.

2. The method of claim 1, further comprising:
   in response to determining that the image file in the email contains at least a partial image of the user,
   generating or modifying an image gallery containing image files individually having at least a partial image of the user; and
   transmitting, via the computer network, the generated or modified image galley to another user having access to the inbox on the one or more email servers.

3. The method of claim 1, further comprising:
   in response to determining that the image file in the email contains at least a partial image of the user, transmitting, via the computer network, a copy of the image file along with the inserted metadata value to a client device corresponding to another user having access to the inbox on the one or more email servers.

4. The method of claim 1, further comprising:
   in response to determining that the image file in the email contains at least a partial image of the user, updating an image search index to indicate that the stored image file contains at least a partial image of the user.

5. The method of claim 1, further comprising:
   upon detecting that an email in the inbox contains an image file, retrieving, via the computer network, another image file known to contain an image of the user from the inbox on the one or more email servers; and
   wherein determining whether the image file in the email contains at least a partial image of the user includes determining, via facial recognition, whether the image file in the email contains at least a partial image of the user based on the image of the user in the retrieved another image file.

6. The method of claim 1 wherein determining, via facial recognition, whether the image file in the email contains at least a partial image of the user includes:
   extracting one or more landmarks from the retrieved identification photo of the user's face; and
   determining whether the extracted one or more landmarks are present in the image file.

7. The method of claim 1 wherein determining, via facial recognition, whether the image file in the email contains at least a partial image of the user includes:
   extracting one or more landmarks from the retrieved identification photo of the user's face;
   determining whether the extracted one or more landmarks are present in the image file; and
   indicating that the image file contains at least a partial image of the user in response to determining that the extracted one or more landmarks are present in the image file.

8. The method of claim 1, further comprising in response to determining that the image file in the email contains at least a partial image of the user, repeating the retrieving and determining operations for additional identification photos of additional users.

9. The method of claim 1 wherein scanning the inbox includes:
   determining whether the email in the inbox contains an attachment;
   in response to determining that the email in the inbox contains an attachment, determining whether the attachment has a file extension indicating an image file; and
   in response to determining that the attachment has a file extension indicating an image file, indicating that the email contains an image file.

10. A computing device configured to be interconnected to one or more client devices by a computer network, the computing system comprising:
   a processor; and
   a memory operatively coupled to the processor, the memory containing instructions executable by the processor to cause the computing device to:
      determine whether one or more image files are included as attachment to emails in an inbox corresponding to a user's email account; and
      upon determining that one or more image files are included as attachment to the emails in the inbox,
         retrieve an identification photo of the user from an address book containing entries of user identifications and corresponding identification photos of users in an organization;
         derive one or more facial landmarks of the person from the retrieved identification photo of the user;
         apply facial recognition; to determine whether the one or more image files individually contain at least a partial image of a person using the one or more facial landmarks of the person derived from the identification photo of the user; and
         in response to determining that the one or more image files contain at least a partial image of the person, modify a metadata value of the one or more image files to indicate that the one or more image files contain at least a partial image of the person and store the one or more image files along with the modified metadata value in the inbox corresponding to the user's email account, the metadata being searchable for locating the image file included as attachment to the email in the inbox based on one or more keywords.

11. The computing device of claim 10 wherein the memory contains additional instructions executable by the processor to cause the computing device to:
   in response to determining that the image file in the email contains at least a partial image of the user,
      generate or modify an image gallery containing image files individually having at least a partial image of the user; and
      transmit, via the computer network, the generated or modified image galley to another user having access to the inbox on the one or more email servers.

12. The computing device of claim 10 wherein the memory contains additional instructions executable by the processor to cause the computing device to:
   in response to determining that the image file in the email contains at least a partial image of the user, transmit, via the computer network, a copy of the image file along with the inserted metadata value to a client device corresponding to another user having access to the inbox on the one or more email servers.

13. The computing device of claim 10 wherein the memory contains additional instructions executable by the processor to cause the computing device to:
   in response to determining that the image file in the email contains at least a partial image of the user, update an image search index to indicate that the stored image file contains at least a partial image of the user.

14. The computing device of claim 10 wherein the memory contains additional instructions executable by the processor to cause the computing device to:
   upon detecting that an email in the inbox contains an image file, retrieve, via the computer network, another image file known to contain an image of the user from the inbox on the one or more email servers; and
   wherein to determine whether the image file in the email contains at least a partial image of the user includes to determine, via facial recognition, whether the image file in the email contains at least a partial image of the user based on the image of the user in the retrieved another image file.

15. The computing device of claim 10 wherein the memory contains additional instructions executable by the processor to cause the computing device to repeating the retrieving and determining operations for additional identification photos of additional users in response to determining that the image file in the email does not contain at least a partial image of the user.

16. A method for automatic image classification in a computing system having one or more email servers interconnected to client devices by a computer network, the method comprising:
   determining whether an image file is included as an attachment to an email received in an inbox corresponding to a user's email account; and
   in response to determining that the image file is included as the attachment to the email received in the inbox,
      retrieving a profile or identification photo of the person or another image file previously identified as containing an image of the person;
      deriving one or more features of the person from the retrieved profile or the identification photo of the person or the another image file previously identified as containing an image of the person;
      applying facial recognition to determine whether the image file contains at least a partial image of the person using the one or more features of the person derived from the retrieved profile or the identification photo of the person or the another image file previously identified as containing an image of the person; and
      in response to determining that the image file contains at least a partial image of the person,
         modifying a metadata value of the image file to indicate that the image file contains at least a partial image of the person; and
         storing the image file along with the modified metadata value in the inbox corresponding to the user's email account, the metadata being searchable for locating the image file included as the attachment to the email in the inbox based on one or more keywords.

17. The method of claim 16, further comprising:
   in response to determining that the image file in the email contains at least a partial image of the user, generating or modifying an image gallery containing image files individually having at least a partial image of the user; and transmitting, via the computer network, the generated or modified image galley to another user having access to the inbox on the one or more email servers.

18. The method of claim 16, further comprising:

in response to determining that the image file in the email contains at least a partial image of the user, transmitting, via the computer network, a copy of the image file along with the inserted metadata value to a client device corresponding to another user having access to the inbox on the one or more email servers.

19. The method of claim 16, further comprising:

in response to determining that the image file in the email contains at least a partial image of the user, updating an image search index to indicate that the stored image file contains at least a partial image of the user.

20. The method of claim 16, further comprising:

upon detecting that an email in the inbox contains an image file, retrieving, via the computer network, another image file known to contain an image of the user from the inbox on the one or more email servers; and wherein determining whether the image file in the email contains at least a partial image of the user includes determining, via facial recognition, whether the image file in the email contains at least a partial image of the user based on the image of the user in the retrieved another image file.

* * * * *